(12) United States Patent
Kee et al.

(10) Patent No.: US 7,711,181 B2
(45) Date of Patent: May 4, 2010

(54) METHOD OF ESTIMATING DISPARITY FOR 3D OBJECT RECOGNITION

(75) Inventors: Seokcheol Kee, Yongin-si (KR); Haibing Ren, Beijing (CN); Jiali Zhao, Beijing (CN)

(73) Assignee: Samsung Electroncis Co., Ltd., Suwon-Si (KR)

( * ) Notice: Subject to any disclaimer, the term of this patent is extended or adjusted under 35 U.S.C. 154(b) by 928 days.

(21) Appl. No.: 11/168,346

(22) Filed: Jun. 29, 2005

(65) Prior Publication Data
US 2006/0013509 A1   Jan. 19, 2006

(30) Foreign Application Priority Data
Jul. 15, 2004   (KR)   ...................... 10-2004-0055089

(51) Int. Cl.
*G06K 9/00*   (2006.01)

(52) U.S. Cl. ........................ 382/154; 382/151; 382/162; 382/164; 382/165; 382/167

(58) Field of Classification Search ................. 382/154, 382/151, 162, 164, 165, 167
See application file for complete search history.

(56) References Cited

U.S. PATENT DOCUMENTS 6,714,665 B1 * 3/2004 Hanna et al. ................. 382/117
2004/0240725 A1 * 12/2004 Xu et al. ...................... 382/154

OTHER PUBLICATIONS

Y. Boykov, et al., Fast Approximate Energy Minimization via Graph Cuts, Proceedings of "Internation Conference on Computer Vision", Greece, Sep. 1999, vol. I, pp. 377-384.

* cited by examiner

*Primary Examiner*—Samir A. Ahmed
*Assistant Examiner*—Mike Rahmjoo
(74) *Attorney, Agent, or Firm*—Staas & Halsey LLP

(57) ABSTRACT

There is provided a method of estimating disparity for 3D object recognition. The method includes obtaining a plurality of images having different resolutions for the stereo image, estimating a disparity map for a lowest-resolution level image, estimating a coarse disparity map for an upper resolution level image by using the disparity, obtaining a fine disparity map for the upper resolution level image by using the coarse disparity, and outputting the fine disparity map as a final disparity map for the stereo image if the upper resolution level image has a resolution of a highest level.

17 Claims, 14 Drawing Sheets

METHOD OF ESTIMATING DISPARITY FOR 3D OBJECT RECOGNITION

CROSS-REFERENCE TO RELATED APPLICATION

This application claims the benefit of Korean Patent Application No. 10-2004-0055089, filed on Jul. 15, 2004, in the Korean Intellectual Property Office, the disclosure of which is incorporated herein in its entirety by reference.

BACKGROUND OF THE INVENTION

1. Field of the Invention

Embodiments of the present invention relate to a method and apparatus for estimating a disparity for 3D object recognition, and more particularly, to a method of estimating a disparity for 3D object recognition from a stereo image picked up with two cameras separated from each other by a predetermined distance.

2. Description of the Related Art

Stereo matching is a process for extracting depth information from two images of the same scene picked up at different viewpoints. The depth information is calculated based on relative positions of the same object projected on the two images. In the stereo matching process, it is difficult to point out pixels representing the same object in the two images.

Positions of the corresponding pixels in the two images are related to a one-dimensional variation in the epi-polar line direction, that is, a disparity for the images. A disparity is estimated by locating a pixel of the one image relative to the corresponding pixel of the other image. The estimation of the disparity presents an energy minimization problem. In order to solve the energy minimization problem, there are proposed various algorithms including a graph cut algorithm.

In the graph cut algorithm, the estimation of the disparity begins with obtaining a disparity map f which minimizes an energy E(f) represented with Equation 1, $$E(f) = E_{data}(f) + E_{smooth}(f), \quad (1)$$

where $E_{data}(f)$ denotes a data energy obtained by measuring disagreement between the corresponding pixels of the stereo image, and $E_{smooth}(f)$ denotes a smooth energy obtained by measuring smoothness of the disparity map.

In the graph cut algorithm, the data energy $E_{data}(f)$ is calculated from a difference between pixel values (or intensities) corresponding to the same real object in the two images. The smooth energy $E_{smooth}(f)$ is calculated by using Equation 2, $$E_{smooth}(f) = \sum_{\{p,q\} \in N} V_{p,q}(f_p, f_q) T(f(p) \neq f(q)) \quad (2)$$

$$T(a) = \begin{cases} 0 & a \text{ is false} \\ 1 & a \text{ is true} \end{cases}$$

$$V_{p,q}(f_p, f_q) = \begin{cases} 0 & f_p = f_q \\ \lambda & (f_p \neq f_q) \ \& \ (|I_L(p) - I_L(q)| > 5), \\ 2\lambda & (f_p \neq f_q) \ \& \ (|I_L(p) - I_L(q)| \leq 5) \end{cases}$$

where p and q denote neighboring pixels in one image, and f(p) and f(q) denote disparities for the pixels p and q, respectively. N denotes a set of neighboring pixels p and q. $V_{p,q}(f_p, f_q)$ denotes a penalty. If disparities for the two neighboring pixels p and q are different from each other, the penalty $V_{p,q}(f_p, f_q)$ increases the smooth energy as described in Equation 2. $\lambda$ denotes a smooth energy coefficient.

In the graph cut algorithm for estimating the disparity, how the smooth energy coefficient $\lambda$ is determined is important.

FIGS. 1 and 2 show original images and associated disparity maps. More specifically, FIGS. 1A and 1B show left and right original images, respectively. FIG. 1C shows a ground-truth disparity map. FIGS. 2A to 2C show disparity maps for the smooth energy coefficients $\lambda$ of 2, 6, and 12, respectively, obtained by using the graph cut algorithm. FIG. 2A shows a disparity map of an under-smooth case, which contains a large amount of noise. FIG. 2C shows a disparity map of an over-smooth case, which hardly represents discontinuities between the objects. FIG. 2B shows more distinguishable objects than the cases of FIGS. 2A and 2C.

FIG. 3 shows gross error ratios of disparity maps with respect to the ground-truth disparity map according to the smooth energy coefficient $\lambda$ when an image has different resolutions. As shown in FIG. 3, it can be understood that an optimal smooth energy coefficient $\lambda$ for a half-resolution image is completely different from an optimal smooth energy coefficient $\lambda$ for a double-resolution image.

Therefore, in order to obtain an optimal disparity map for a stereo image, it is necessary to calculate different smooth energy coefficients for images.

SUMMARY OF THE INVENTION

An embodiment of the present invention provides a method of estimating a disparity for adaptively obtaining smooth energy coefficients according to resolutions of images and applying the obtained smooth energy coefficients to a hierarchical graph cut algorithm.

According to an aspect of the present invention, there is provided a method of estimating a disparity of a stereo image. The method comprises obtaining a plurality of images having different resolution levels for the stereo image, estimating a disparity map for a lowest-resolution level image, estimating a coarse disparity map for an upper resolution level image by using the disparity map, obtaining a fine disparity map for the upper resolution level image by using the coarse disparity map, and outputting the fine disparity map as a final disparity map for the stereo image if the upper resolution level image has a resolution of a highest level.

According to another aspect of the present invention, there is provided a computer storage to control a computer according to a method of estimating a disparity of a stereo image. The method comprises obtaining a plurality of images having different resolution levels for the stereo image, estimating a disparity map for a lowest-resolution level image, estimating a coarse disparity map for an upper resolution level image by using the disparity, obtaining a fine disparity map for the upper resolution level image by using the coarse disparity, and outputting the fine disparity map as a final disparity map for the stereo image if the upper resolution level image has a resolution of a highest level.

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1A:
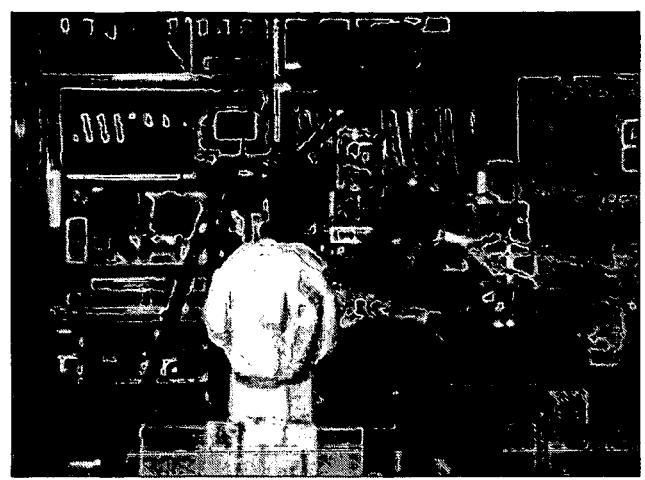
FIG. 1A shows a left image of an original image.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 4:
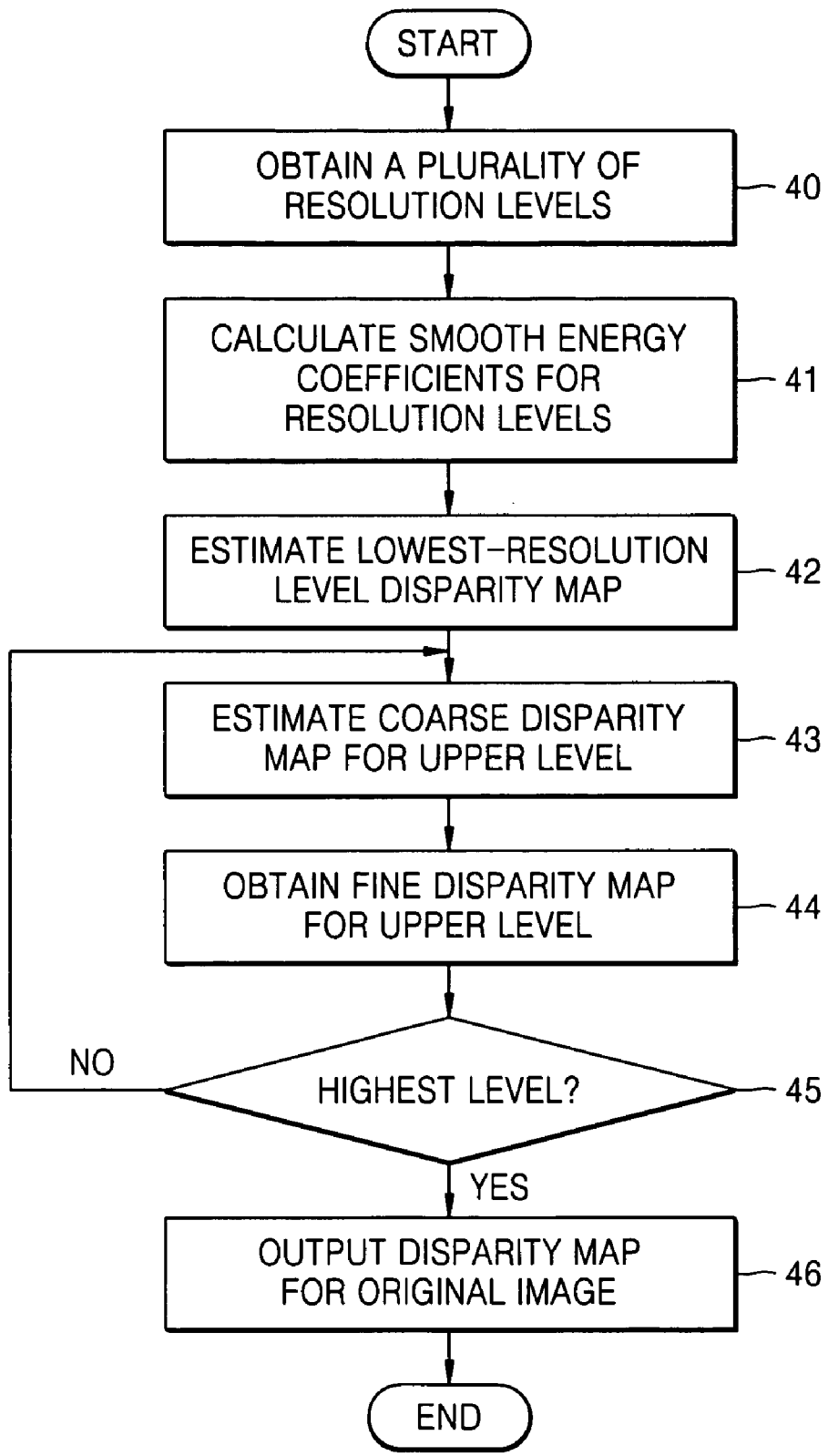
FIG. 4 is a flowchart of a disparity estimation method according to an embodiment of the present invention.

FIG. 4 is a flowchart of a disparity estimation method according to an embodiment of the present invention. In an embodiment of the present invention, a hierarchical graph cut algorithm is used to estimate the disparity. Here, the term "hierarchical" is related to a process for obtaining the disparity map by obtaining various resolution images for an original image and applying the graph cut algorithm to the various resolution images sequentially in order from a lowest to a highest resolution to obtain the disparity map. The smooth energy coefficients applied to layers may be different depending on the resolutions.

Firstly, a plurality of resolution levels are obtained from an original image (Operation 40). The number of resolution levels is determined based on the number of selected layers. Each of the images has $½^n$-times resolution of the original image, where n is a natural number.

Next, smooth energy coefficients λ for the resolution levels are calculated (Operation 41). Although smooth energy coefficients may be set to be equal for all resolution levels, the smooth energy coefficients according to an embodiment of the present invention may adaptively vary with the resolution levels. Each of the smooth energy coefficients can be calculated by using textures of the image. If there is a single texture of the image, the disparity can be easily calculated by using pixel matching. However, in general, most images have multiple textures. Therefore, the disparity calculation involves a smooth term in addition to a pixel correspondence term.

In general, in the estimation of a disparity for an image with many textures, the smooth term dominates over the pixel correspondence term. On the contrary, in the estimation of a disparity for an image with fewer textures, the pixel correspondence term dominates over the smooth term.

In other words, a smooth energy coefficient λ for an image is related to textures of the image. In an embodiment of the present invention, a texture T(x,y) of a pixel located at a position (x,y) is defined as Equation 3, $$T(x, y) = \sqrt{\left(\frac{1}{x_k}\sum_{i=1}^{x_k}\frac{I(x+i, y) - I(x-i, y)}{2i}\right)^2 + \left(\frac{1}{y_k}\sum_{i=1}^{y_k}\frac{I(x, y-i) - I(x, y-i)}{2i}\right)^2} \quad (3)$$

, where x=1, 2, . . . , width, and y=1, 2, . . . , height. The terms 'width' and 'height' denote a width and height of an image, respectively. In addition, $x_k$=min(x−1, width−x, 2), $y_k$=min(y−1, height−y, 2), and I(x, y) is an image pixel value. In addition, if $x_k$=0 and $y_k$=0, then T(x,y)=0.

The smooth energy coefficient λ can be directly calculated based on the texture T(x,y) of Equation 3 by using Equation 4, $$\lambda = \sum_{i=m}^{n} a_i T(x, y)^i, \quad (4)$$

where m and n satisfy a predetermined range: m<0<n.

In Equation 4, a parameter $a_i$ should be determined. In order to determine the parameter $a_i$, a large number of learning samples are required. In addition, the parameter $a_i$ needs to be determined, so that an optimal smooth energy coefficient λ for a given original image and ground-truth disparity map can be obtained.

Therefore, several learning samples having a stereo image and a ground-truth disparity map are collected. Next, each of the learning samples is subjected to scaling and segmentation to increase the number of learning samples. And then, the smooth energy coefficients λ are calculated.

Figure 5:
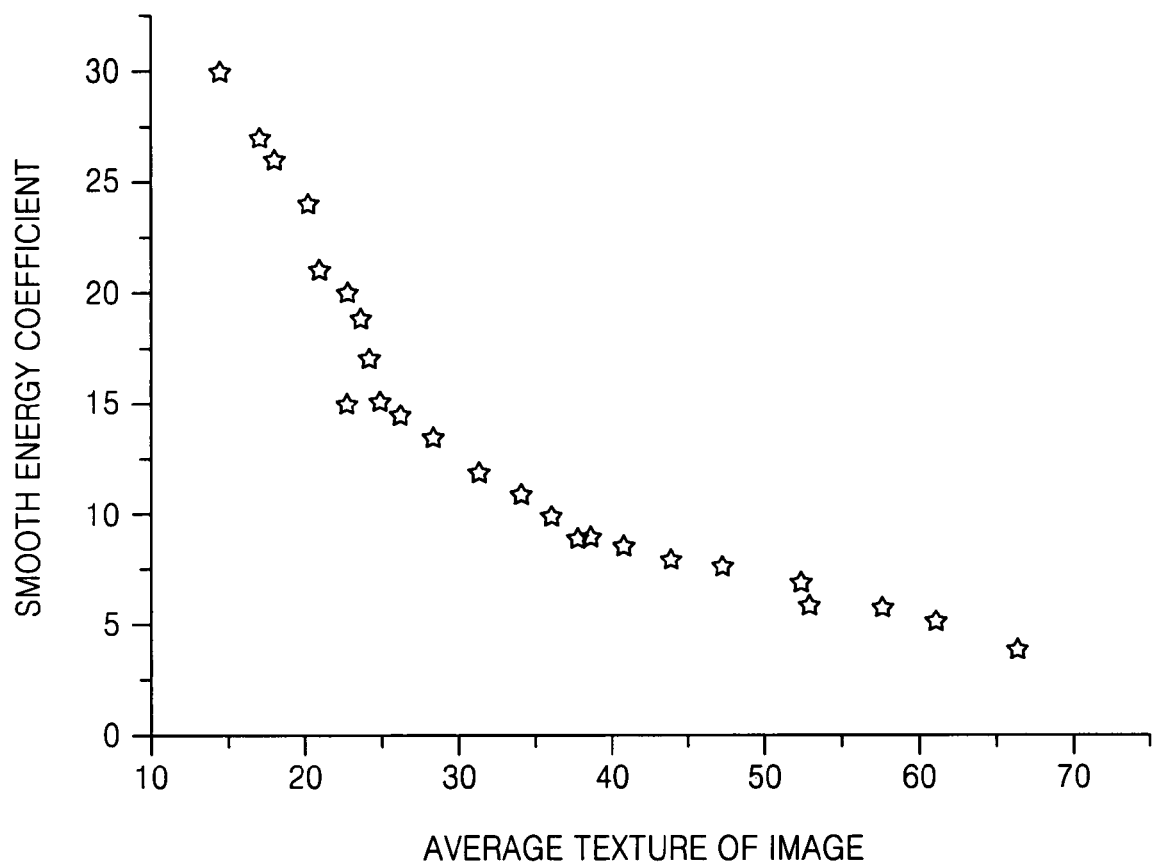
FIG. 5 is a graph showing a relation between a smooth energy coefficient and an average texture of an image.

FIG. 5 is a graph showing a relation between the smooth energy coefficient λ and the average texture of the image. As shown in FIG. 5, it can be understood that the smooth energy coefficient λ is inversely proportional to the average texture.

In an alternative method of determining the smooth energy coefficient λ, the smooth energy coefficient λ is assumed to be an integer number. In the alternative method, available smooth energy coefficients λ are searched, and a suitable smooth energy coefficient λ is selected among the searched smooth energy coefficients λ.

The above methods of determining the smooth energy coefficient λ result in a large amount of calculation. Therefore, the smooth energy coefficient λ may be calculated by the following algorithm:

$$\lambda_{k+1} = \lambda_k - \beta \cdot M(D_k, G) \qquad (5)$$

where $\lambda_k$ denotes a smooth energy coefficient λ of k-th iteration, and β denotes a step size. $D_k$ denotes a disparity map estimated based on the smooth energy coefficient $\lambda_k$ by using the graph cut algorithm. G denotes the ground-truth disparity map. $M(D_k,G)$ denotes a function for measuring smoothness between the disparity map $D_k$ and the ground-truth disparity map G. For example, if the disparity map $D_k$ is less than the ground-truth disparity map G, then $M(D_k,G)>0$. If not, $M(D_k,G)<0$. In an embodiment of the present invention, the disparity map $D_k$ is determined by using edge information of the disparity map.

Next, a disparity map for a lowest-resolution level image is estimated (Operation 42). The disparity map for the lowest-resolution level image may be estimated by using a conventional graph cut algorithm. One of the conventional graph cut algorithms is disclosed in an article, by Y Boykov et al., titled "Fast Approximate Energy Minimization via Graph Cuts," (IEEE Transactions on Pattern Analysis and Machine Intelligence, Vol. 23, Issue 11, November 2001, pp. 1222-1239).

Next, a coarse disparity map for an upper level image is estimated based on the estimated disparity map for the lowest-resolution level image (Operation 43). More specifically, in an embodiment of the present invention, a resolution of an upper layer is set to be double that of a resolution of the lower layer. In other words, a pixel of a lower level image corresponds to 4 pixels of an upper level image, so that a disparity for 4 pixels is double that of the disparity for the corresponding pixel of the lower level image. As a result, a coarse disparity map for the upper level image can be obtained by doubling the disparity of the disparity map for the lower level image.

Next, a fine disparity map for the upper level image is obtained based on the coarse disparity map for the upper level image and the smooth energy coefficient λ calculated in Operation 41 (Operation 44). The fine disparity map may be obtained by using a coarse-to-fine graph cut algorithm according to an embodiment of the present invention.

Now, the coarse-to-fine graph cut algorithm will be described in detail.

Figure 6:
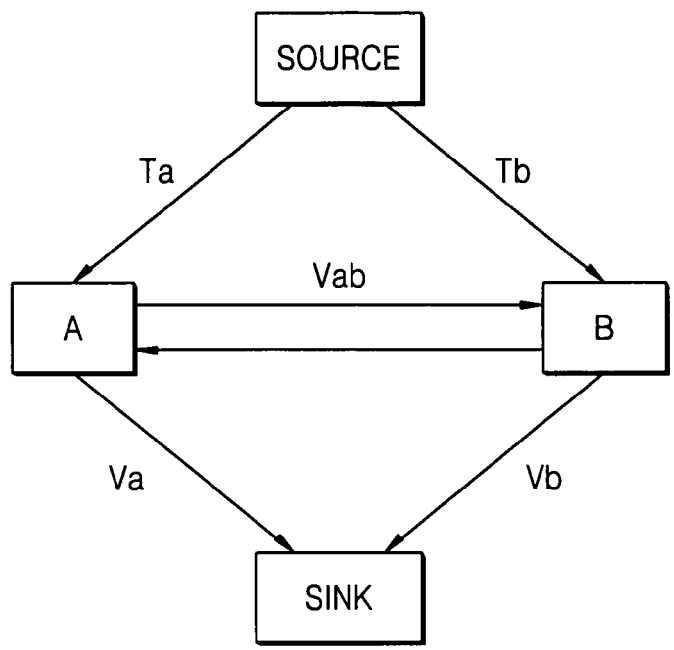
FIG. 6 is a diagram obtained by using an α-expansion scheme in a coarse-to-fine graph cut algorithm when initial disparities for two neighboring pixels are equal to each other, according to an embodiment of the present invention.

FIG. 6 is a diagram obtained by using an α-expansion scheme in the coarse-to-fine graph cut algorithm when initial disparities for two neighboring pixels are equal to each other, according to an embodiment of the present invention. Here, the initial disparities are disparities A0 and B0 obtained from the coarse disparity map. A value of α is a maximum disparity heuristically set based on a distance between two cameras, being used to classify various regions included in an image into (α+1) labels from 0 to α.

In the graph of FIG. 6, two neighboring pixels A and B are designated as vertexes. A source and a sink are referred to as super vertexes or terminals. Here, the two neighboring pixels are, for example, pixel A and pixel B (one of four pixels located at left, right, upper, and lower positions centered around pixel A). The source is labeled as α, and the sink is labeled properly in order to maintain initial disparities A0 and B0 of pixels.

In FIG. 6, Ta and Tb denote weights of edges from the source to the vertexes. Va and Vb denote weights of edges from the vertexes to the sink. Vab denotes a weight of two edges between two vertexes.

$$Tb = D(B, \text{source}) + \sum_{\substack{p \in N(B) \\ p \notin P(\text{source})}} V(B, \text{source}, p, f_p) \qquad (6)$$

$$Ta = D(A, \text{source}) + \sum_{\substack{p \in N(A) \\ p \notin P(\text{source})}} V(A, \text{source}, p, f_p)$$

$$Vab = V(A, \text{source}, B, B0) = V(A, A0, B, \text{source}) \text{ if}$$

$A0 = \text{source}$, then $Va = \text{MAX\_ENERGY}$ else $$Va = D(A, A0) + \sum_{\substack{p \in N(A) \\ p \notin P(\text{source})}} V(A, A0, p, f_p) \text{ if}$$

$B0 = \text{source}$, then $Vb = \text{MAX\_ENERGY}$ else $$Vb = D(B, B0) + \sum_{\substack{p \in N(B) \\ p \notin P(\text{source})}} V(B, B0, p, f_p)$$

Here, p∉P(source) means that the disparity for the pixel p is not in a range of [α−1, α+1], and accordingly, there is no vertex corresponding to the pixel p in the graph. N(A) denotes a set of neighboring pixels for the pixel A. In addition, p∈N(A) means that the pixel p is one of the neighboring pixels for the pixel A. D(A, source) is a data energy when the pixel A has the disparity α for the source. D(A, A0) denotes a data energy when the disparity for the pixel A is A0. V(A, source, p, $f_p$) denotes a smooth energy between the pixel A and p obtained by using Equation 2 when a disparity for the pixel A is α and a disparity for the pixel p is the disparity $f(p)(=f_p)$. MAX_ENERGY denotes a maximum energy.

Now, the α-expansion of the coarse-to-fine graph cut algorithm in an embodiment of the present invention will be described in detail. The disparity for the pixel A having an initial disparity of A0 can vary among the disparities of A0−1, A0, and A0+1. Therefore, if the maximum disparity α satisfies a condition: A0−1≦α≦A0+1, then the pixel A has a corresponding vertex in the graph. If A0−1>α or A0+1<α, then the pixel A has no corresponding vertex in the graph. As a result, only the pixels whose disparities are in a range of [α−1, α+1] can have corresponding vertexes in the graph.

Figure 7:
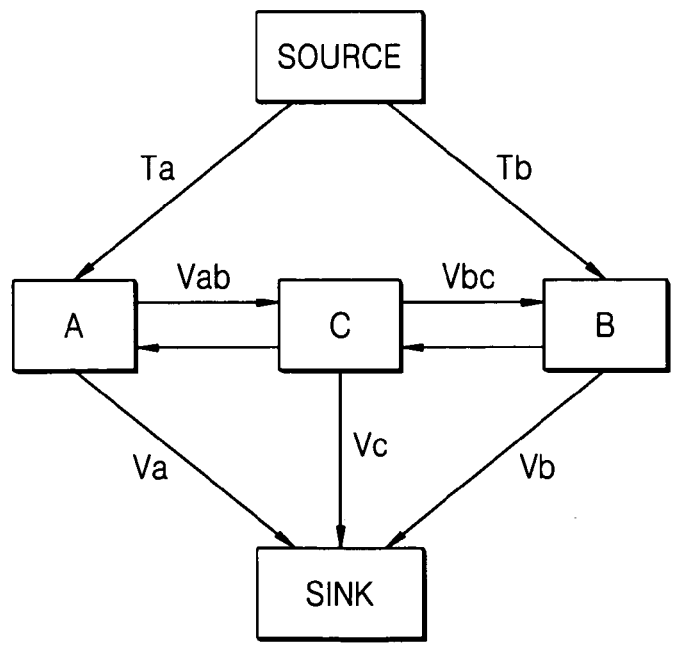
FIG. 7 is a diagram obtained by using an α-expansion scheme in a coarse-to-fine graph cut algorithm when initial disparities for two neighboring pixels are not equal to each other, according to an embodiment of the present invention.

FIG. 7 is a diagram obtained by using the α-expansion scheme in the coarse-to-fine graph cut algorithm when the initial disparities A0 and B0 of the two neighboring pixels A and B are not equal to each other, according to an embodiment of the present invention.

Vertexes and terminals of FIG. 7 are the same as those of FIG. 6. In the graph, a vertex C does not correspond to any pixel in the original image and added to the graph when the initial disparities A0 and B0 are not equal to each other. Each edge weight is determined as follows.

$$Ta = D(A, \text{source}) + \sum_{\substack{p \in N(A) \\ p \notin P(\text{source})}} V(A, \text{source}, p, f_p) \quad (7)$$

$$Tb = D(B, \text{source}) + \sum_{\substack{p \in N(B) \\ p \notin P(\text{source})}} V(B, \text{source}, p, f_p)$$

$$Vbc = V(A, \text{source}, B, B0)$$

$$Vac = V(A, A0, B, \text{source})$$

$$Vc = V(A, A0, B, B0) \text{ if}$$

$A0 = \text{source}$, then $Va = \text{MAX\_ENERGY}$ else $$Va = D(A, A0) + \sum_{\substack{p \in N(A) \\ p \notin P(\text{source})}} V(A, A0, p, f_p) \text{ if}$$

$B0 = \text{source}$, then $Vb = \text{MAX\_ENERGY}$ else $$Vb = D(B, B0) + \sum_{\substack{p \in N(B) \\ p \notin P(\text{source})}} V(B, B0, p, f_p)$$

In the graphs shown in FIGS. 6 and 7, some edges whose sum of weights is minimal among the edges directed from the source to the sink through the vertexes are subjected to cutting. As the result of cutting, the labels of pixels connected to the source are maintained, and the labels of pixels connected to the sink are converted to α. The disparity map is formed so that different pixels are labeled differently from each other.

Next, it is determined whether or not the upper level in Operation 44 is the highest level (Operation 45). If the upper level is the highest level, the disparity obtained for the highest level is output as a final disparity map (Operation 46). If not, the procedure returns to Operation 43 to estimate the coarse disparity map for the next upper level by using the disparity map for the current level.

Figure 1B:
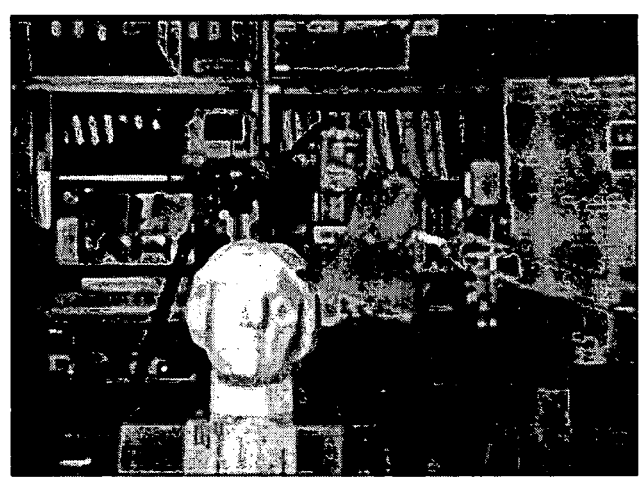
FIG. 1B shows a right image of the original image.
Figure 1C:
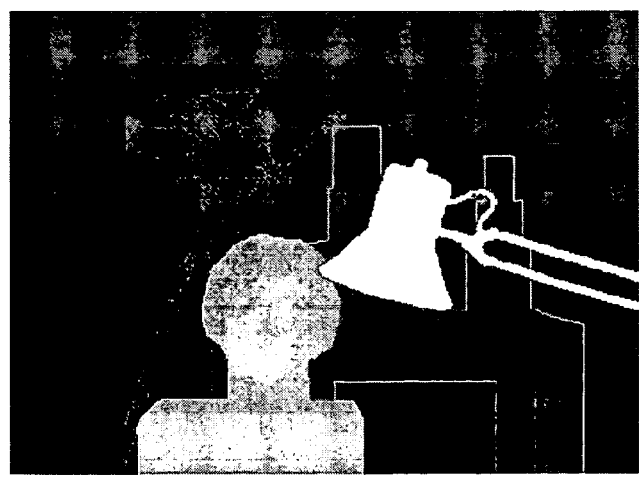
FIG. 1C shows a ground-truth disparity map.
Figure 2A:
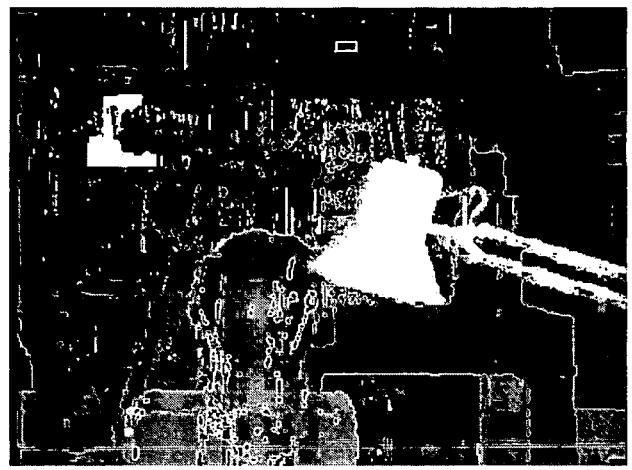
FIGS. 2A to 2C show disparity maps having smooth energy coefficients of 2, 6, and 12, respectively, obtained by using a graph cut algorithm.
Figure 2B:
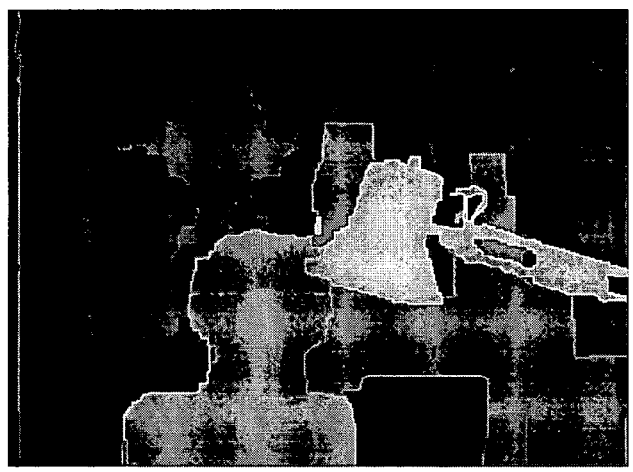
Figure 2C:
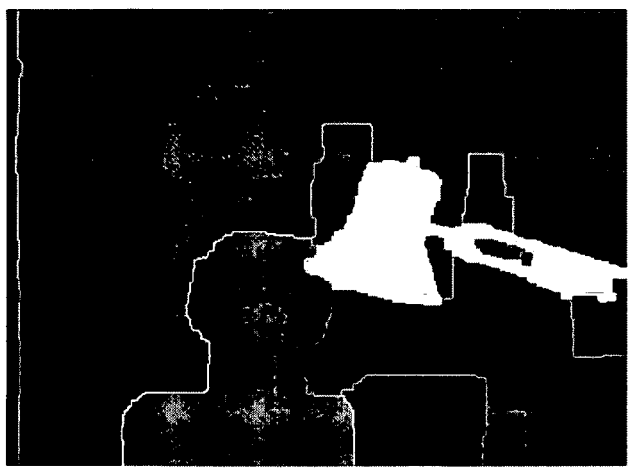
Figure 3:
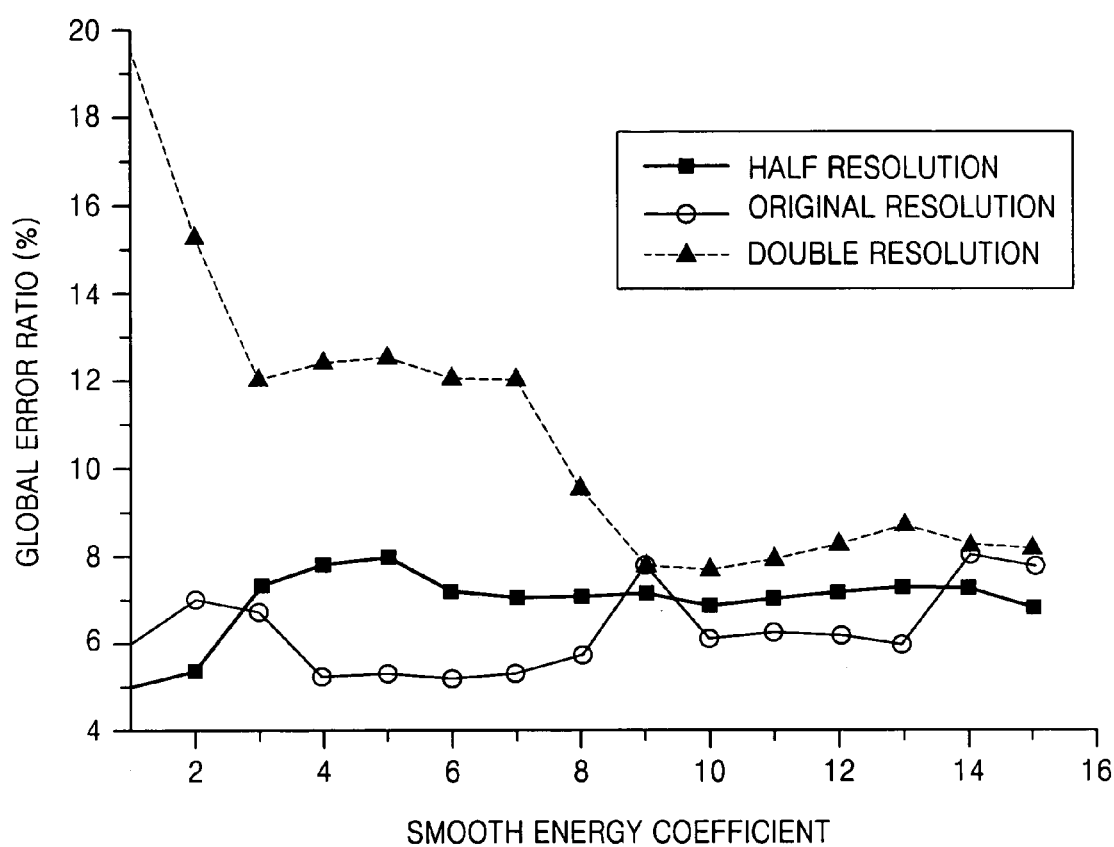
FIG. 3 shows gross error ratios of disparity maps with respect to a ground-truth disparity map according to smooth energy coefficients when an image has different resolutions.
Figure 8A:
FIGS. 8A to 8E show results obtained by applying conventional disparity estimation methods and the disparity estimation method according to an embodiment of the present invention to images of FIGS. 1A and 1B.
Figure 8B:
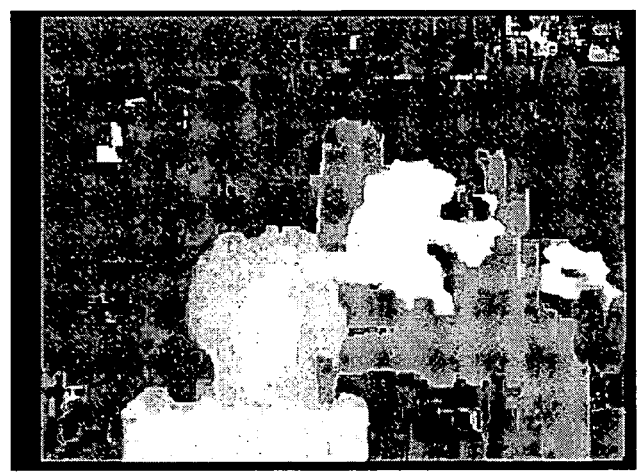
Figure 8C:
Figure 8D:
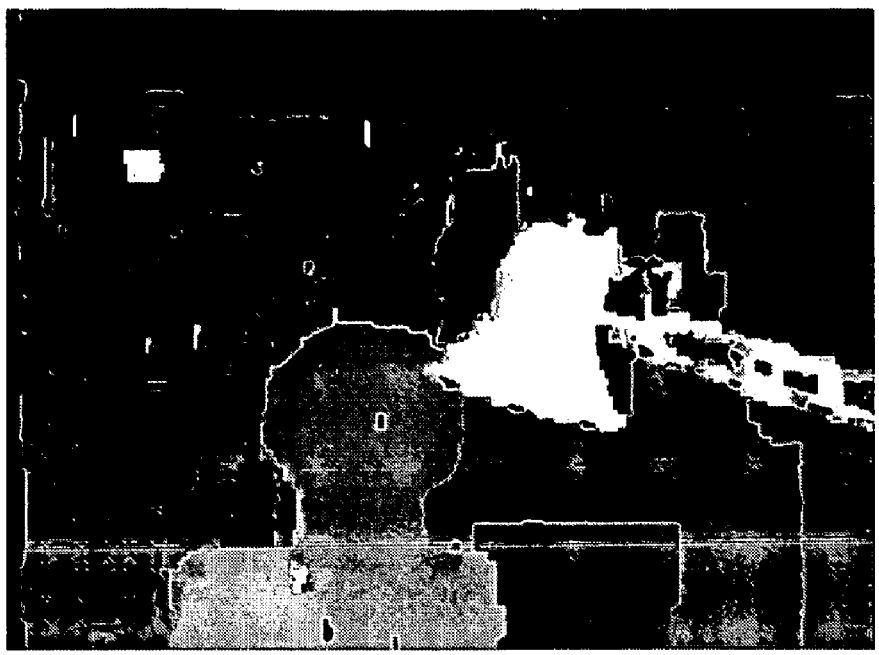
Figure 8E:
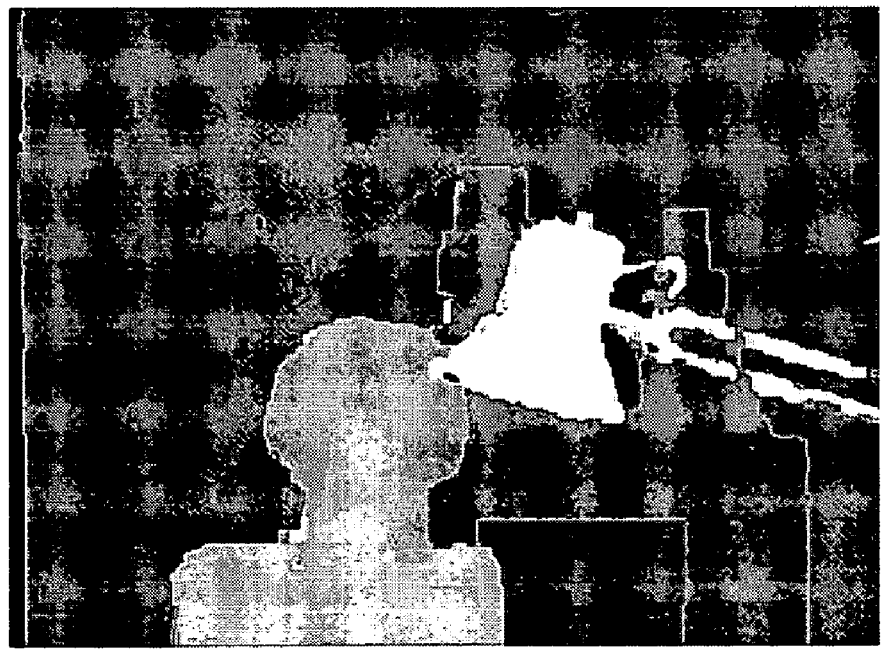

FIGS. 8A to 8E show results obtained by applying conventional disparity estimation methods and the disparity estimation method according to an embodiment of the present invention to images of FIGS. 1A and 1B. More specifically, FIGS. 8A to 8C show results obtained by applying a conventional simulated annealing method, a conventional normal correlation method, and a conventional graph cut algorithm, respectively. FIG. 8D shows the result obtained by applying a smooth energy coefficient to the hierarchical graph cut algorithm according to an embodiment of the present invention. FIG. 8E shows the result obtained by applying an adaptive smooth energy coefficient to the hierarchical graph cut algorithm according to an embodiment of the present invention. In the experiment, two of upper and lower layers are adopted. A resolution of an original image is 768×576; and a range of disparity is [0, 31].

As shown in the figures, it can be understood that regions obtained in the case of FIG. 8E according to an embodiment of the present invention are most distinguishable.

Figure 9:
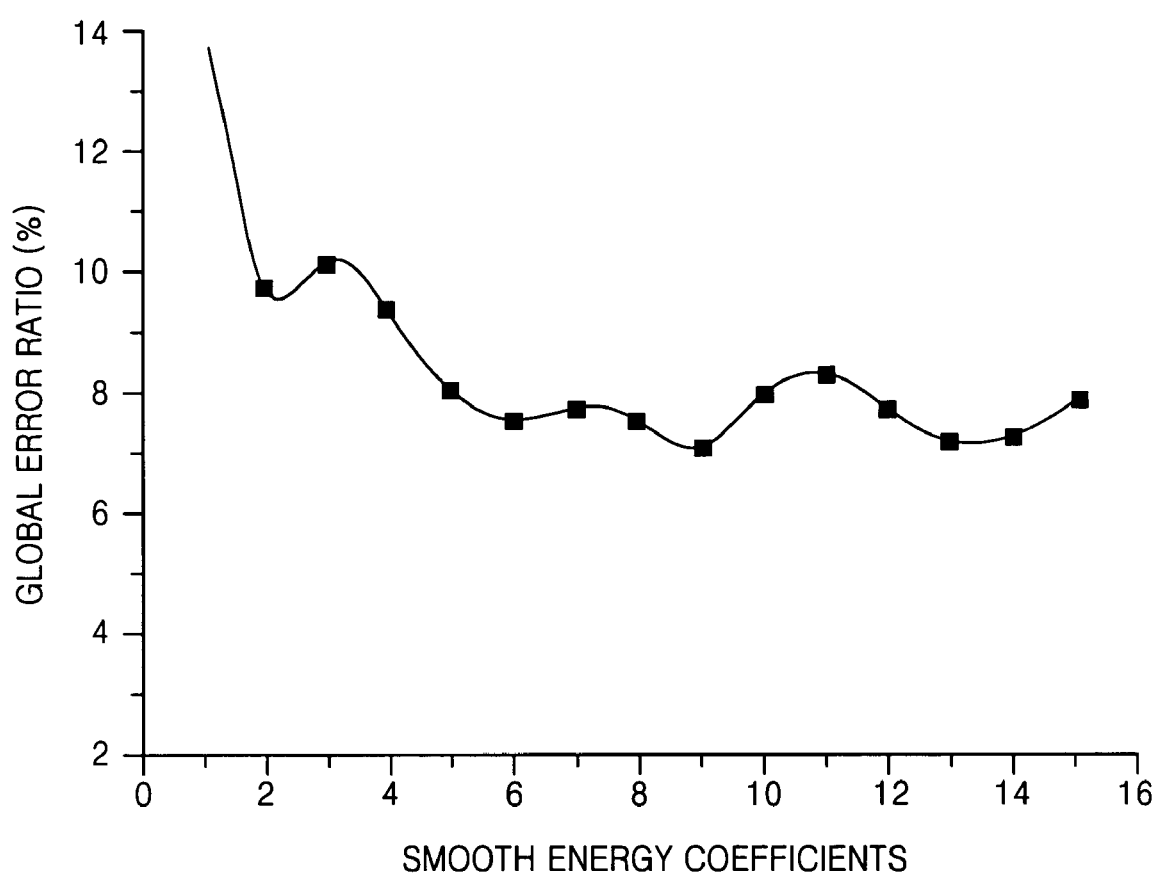
FIG. 9 is a graph showing gross error ratios of disparity maps obtained by using a hierarchical graph cut algorithm having three layers and a constant smooth energy coefficient, according to an embodiment of the present invention.

FIG. 9 shows gross error ratios of disparity maps obtained by applying a hierarchical graph cut algorithm having three layers to an image having a resolution of 768×576 and applying a constant smooth energy coefficient to the three layers, according to an embodiment of the present invention. As shown in the figure, it can be understood that the gross error ratio has a lowest value of 7.12% at the smooth energy coefficient of 9.

In another experiment, the smooth energy coefficients for the respective layers were adaptively estimated and applied to the three-layered hierarchical graph cut algorithm. The gross error ratio became 5.46%.

Table 1 shows the comparison of calculation times and gross error ratios according to the aforementioned disparity estimation methods.

TABLE 1

| Disparity estimation method | Calculation Time (sec) | Gross error ratio (%) |
|---|---|---|
| Simulation Annealing | 10,000 | 12.23 |
| Normal Correlation | 16 | 15.12 |
| Graph Cut | 134 | 5.63 |
| Hierarchical Graph Cut + Constant Smooth energy coefficient | 12.01 | 7.12 |
| Hierarchical Graph Cut + Adaptive Smooth energy coefficient | 12.03 | 5.46 |

As shown in Table 1, it can be understood that the method applying the adaptive smooth energy coefficient to the hierarchical graph cut algorithm according to an embodiment of the present invention has the best results in terms of the calculation time and the gross error ratio.

Figure 10A:
FIG. 10A shows an image of a room where there are humans picked up with a camera installed in a ceiling.
Figure 10B:
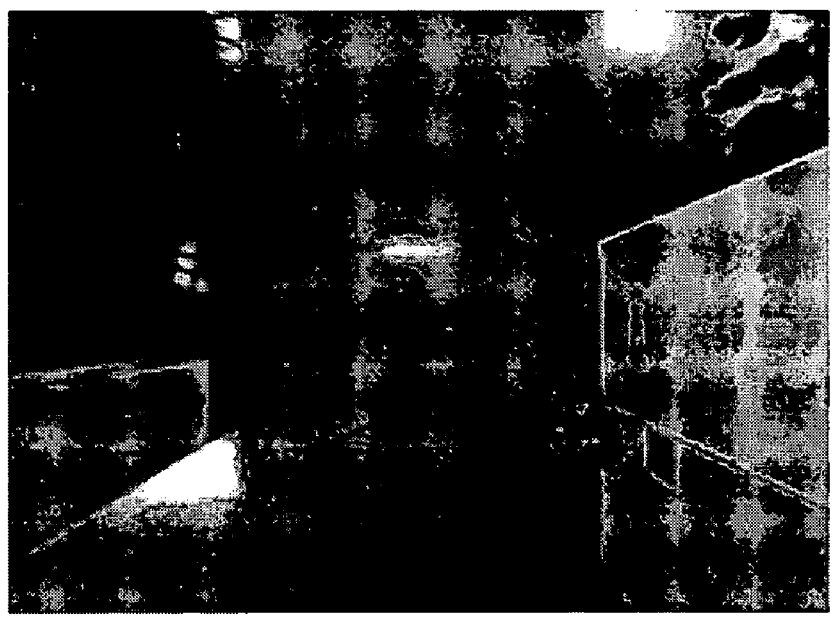
FIG. 10B shows an image of a room where there is no human picked up with the camera installed in the ceiling.
Figure 10C:
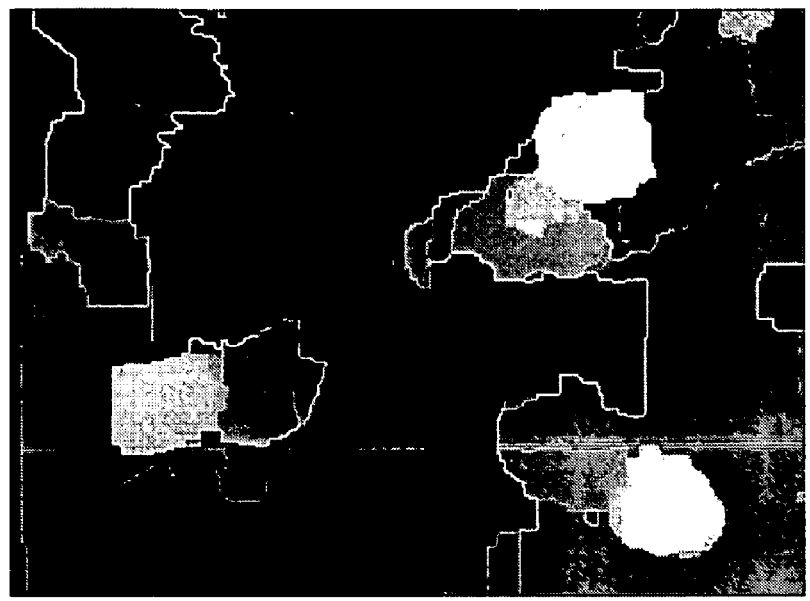
FIGS. 10C and 10D show disparity maps for the images of FIGS. 10A and 10B, respectively, according to an embodiment of the present invention.
Figure 10D:
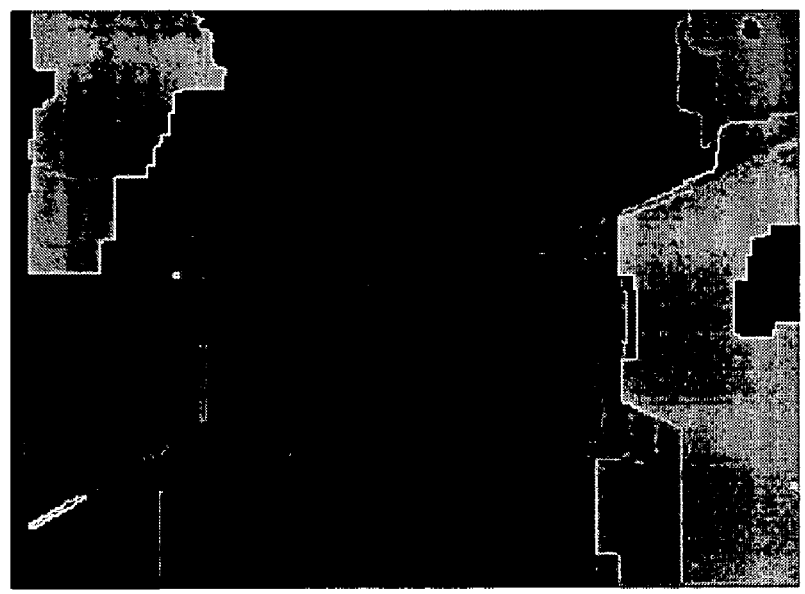

FIGS. 10A to 10D show examples of applying the hierarchical graph cut algorithm according to an embodiment of the present invention to people counting. More specifically, FIG. 10A shows an image of a room where there are humans picked up with a camera installed in a ceiling; and FIG. 10B shows an image of a room where there is no human picked up with the camera installed in the ceiling. FIGS. 10C and 10D show disparity maps for the images of FIGS. 10A and 10B, respectively, according to an embodiment of the present invention.

As shown in FIGS. 10C and 10D, it can be understood that, since there is a difference between a head of a human and a floor by a height of the human in a view from the ceiling, the head of the human is more highlighted than the floor. Therefore, it is possible to count people passing through the door by estimating the disparity of the image.

Figure 11A:
FIG. 11A shows an image of a garden where there is a tree.
Figure 11B:
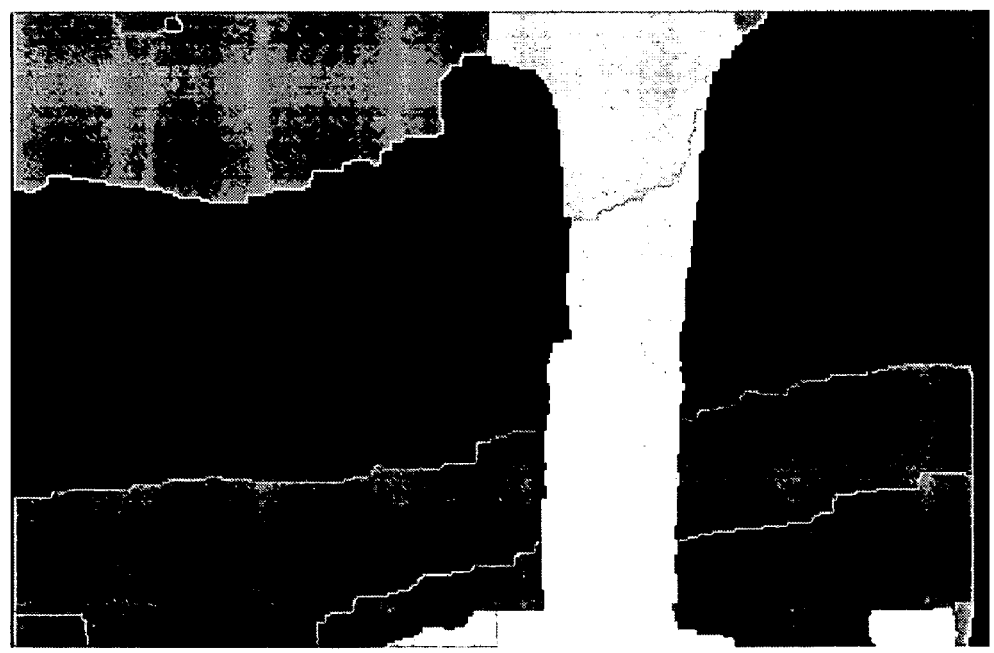
FIG. 11B shows a disparity map for image segmentation with respect to the image of FIG. 11A, according to an embodiment of the present invention.
Figure 12A:
FIG. 12A shows an image of a human being.
Figure 12B:
FIG. 12B shows a disparity map for a face region in the image of FIG. 12A, according to an embodiment of the present invention.

In addition, as shown in FIGS. 11A and 11B, the hierarchical graph cut algorithm according to an embodiment of the present invention may be applied to image segmentation. More specifically, FIG. 11A shows an image of a garden where there is a tree; and FIG. 11B shows a disparity for the image of FIG. 11A, according to an embodiment of the present invention. As shown in FIG. 11B, it can be understood the image is well segmented into various regions. FIGS. 12A and 12B show still another example of applying the hierarchical graph cut algorithm according to an embodiment of the present invention to human face recognition. More specifically, FIG. 12A shows an image of a human; and FIG. 12B shows disparity map for a face region in the image of FIG. 12A, according to an embodiment of the present invention. As shown in FIG. 12B, the face region is well segmented in order to be applied to face recognition.

According to an embodiment of the present invention, resolution of an image is divided into multiple levels, different smooth energy coefficients are applied to different resolution levels, and a hierarchical graph cut algorithm is applied to the resolution level images. Therefore, it is possible to reduce calculation time and gross error ratio.

Figure 13:
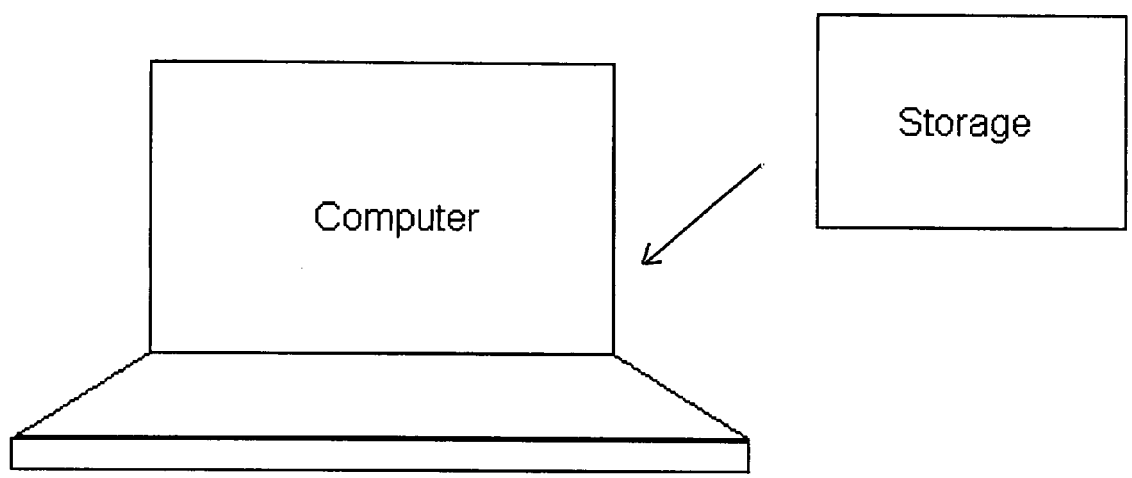
FIG. 13 is a schematic representation of a storage and a computer.

FIG. 13 is a schematic representation of a storage (i.e. a computer readable medium) and a computer. The invention can also be embodied as computer readable code on a computer readable medium. The computer readable medium is any data storage device that can store data which can be thereafter be read by a computer system. Examples of the computer readable medium include read-only memory (ROM), random-access memory (RAM), CD-ROMs, magnetic tapes, floppy disks, optical data storage devices, and carrier waves (such as data transmission through the Internet). The computer readable medium can also be distributed over network coupled computer systems so that the computer readable code is stored and executed in a distributed fashion. Also, functional programs, codes, and code segments for accomplishing embodiments of the present invention can be easily construed by programmers skilled in the art to which embodiments of the present invention pertain.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of estimating a disparity of a stereo image, comprising:

obtaining a plurality of images having different resolution levels for the stereo image;

estimating a disparity map for a lowest-resolution level image;

estimating a coarse disparity map for an upper resolution level image by using the disparity map;

obtaining a fine disparity map for the upper resolution level image by using the coarse disparity map; and outputting the fine disparity map as a final disparity map for the stereo image if the upper resolution level image has a resolution of a highest level, wherein the estimating of the disparity map for the lowest-resolution level image includes obtaining a disparity map which minimizes energy including a smooth energy, the smooth energy being based upon a difference in disparities between neighboring pixels in the disparity map.

2. The method of claim 1, wherein the resolutions of the plurality of images is $\frac{1}{2}^n$ times a resolution of the stereo image, and wherein n is a natural number.

3. The method of claim 2, wherein the coarse disparity map is estimated so that disparities for pixels of the upper resolution level image are double that of disparities for corresponding pixels of a lower resolution level image of which level is lowered by one level from the upper resolution level image.

4. A method of estimating a disparity of a stereo image, comprising:

obtaining a plurality of images having different resolution levels for the stereo image;

estimating a disparity map for a lowest-resolution level image;

estimating a coarse disparity map for an upper resolution level image by using the disparity map;

obtaining a fine disparity map for the upper resolution level image by using the coarse disparity map; and outputting the fine disparity map as a final disparity map for the stereo image if the upper resolution level image has a resolution of a highest level, wherein the disparity map is obtained so that a sum of data energy measured for the stereo image and smooth energy measured by using a predetermined smooth energy coefficient λ are minimized, and the predetermined smooth energy coefficient is determined based on an amount of texture according to a resolution of each resolution level.

5. The method of claim 4, wherein, the predetermined smooth energy coefficient λ is represented with the following equation:

$$\lambda = \sum_{i=m}^{n} a_i T(x, y)^i,$$

where T(x, y) is a texture amount of a pixel located at a position (x, y), m<0<n, and $a_i$ is a coefficient.

6. The method of claim 5, wherein the texture amount T(x, y) is represented with the following equation:

$$T(x, y) = \sqrt{\left(\frac{1}{x_k}\sum_{i=1}^{x_k}\frac{I(x+i, y) - I(x-i, y)}{2i}\right)^2 + \left(\frac{1}{y_k}\sum_{i=1}^{y_k}\frac{I(x, y-i) - I(x, y-i)}{2i}\right)^2},$$

where x=1, 2, ..., image-width, y=1, 2, ..., image-height, $x_k$=min(x−1, image-width−x, 2), $y_k$=min(y−1, image-height−y, 2), and I(x, y) is an image pixel value.

7. The method of claim 4, wherein the predetermined smooth energy coefficient λ is determined so that k-th and (k+1)-th smooth energy coefficients are iteratively determined by using a function for measuring smoothness between a ground-truth disparity map and a disparity map obtained based on the k-th smooth energy coefficient, and k is a natural number.

8. The method of claim 7, wherein the function for measuring the smoothness is determined by using edge information of the disparity map obtained based on the k-th smooth energy coefficient.

9. A method of estimating a disparity of a stereo image, comprising:

obtaining a plurality of images having different resolution levels for the stereo image;

estimating a disparity map for a lowest-resolution level image;

estimating a coarse disparity map for an upper resolution level image by using the disparity map;

obtaining a fine disparity map for the upper resolution level image by using the coarse disparity map; and outputting the fine disparity map as a final disparity map for the stereo image if the upper resolution level image has a resolution of a highest level, wherein the fine disparity map is obtained by:

designating two neighboring pixels A and B as vertexes, if disparities A0 and B0 of the two pixels are equal to each other;

setting a source and a sink connected to the two vertexes;

forming a graph where the two vertexes, the source, and the sink are connected with edges having predetermined weights; and maintaining labels of pixels connected to the source, and converting labels of pixels connected to the sink into a label for the source by cutting edges so that a sum of weights of edges directed from the source to the sink is minimized.

10. The method of claim 9,
wherein each of weights of edges between the source and the two vertexes is represented with a sum of data energy when each pixel has a disparity for the source and smooth energy between each pixel and its neighboring pixels when the neighboring pixels satisfy a first predetermined condition,
wherein each of weights of edges between the two vertexes and the sink is represented with a sum of data energy when each pixel has an initial disparity and the smooth energy between each pixel and its neighboring pixels when the neighboring pixels satisfy a second predetermined condition, and
wherein weights of edges between the two vertexes are represented with smooth energy between two pixels when one of the two pixels has the disparity for the source.

11. The method of claim 10, wherein at least one of the first and second predetermined conditions is that disparities of the neighboring pixels are not in a range of [maximum disparity−1, maximum disparity+1], and corresponding vertexes are not provided to the graph.

12. The method of claim 9, wherein the fine disparity map is obtained by:
designating two neighboring pixels A and B as first and second vertexes respectively, if disparities A0 and B0 of the two pixels are not equal to each other;
setting a source and a sink connected to the first and second vertexes, respectively;
setting a third vertex between the first and second vertexes not to correspond to pixels of the upper resolution level image;
forming a graph where the three vertexes, the source, and the sink are connected with edges having predetermined weights; and
maintaining labels of pixels connected to the source, and converting labels of pixels connected to the sink into a label for the source by cutting edges so that a sum of weights of edges directed from the source to the sink is minimized.

13. The method of claim 12,
wherein each of weights of edges between the source and the first and second vertexes is represented with a sum of data energy when each pixel has a disparity for the source and smooth energy between each pixel and its neighboring pixels when the neighboring pixels satisfy a first predetermined condition,
wherein each of weights of edges between the first and second vertexes and the sink is represented with a sum of data energy when each pixel has an initial disparity and the smooth energy between each pixel and its neighboring pixels when the neighboring pixels satisfy a second predetermined condition,
wherein a weight of an edge between the first or second vertexes and the third vertex is represented with smooth energy between two pixels when a pixel corresponding to the first or second vertex has a disparity for the source, and
wherein a weight of an edge between the third vertex and the sink is represented with smooth energy between two pixels when the two pixels have initial disparities.

14. The method of claim 13, wherein at least one of the first and second predetermined conditions is that disparities of the neighboring pixels are not in a range of [maximum disparity−1, maximum disparity+1], and corresponding vertexes are not provided to the graph.

15. A method of estimating a disparity of a stereo image, comprising:
estimating a disparity map for lowest resolution level image of the stereo image;
estimating a coarse disparity map for an upper resolution level image of the stereo image by using the disparity map; and
obtaining a final disparity map for the stereo image as a fine disparity map for the upper resolution level image using the coarse disparity map if the upper resolution level image has a resolution of a highest level; and
obtaining a final disparity map for the stereo image as a fine disparity map for the upper resolution level image using the coarse disparity map if the upper resolution level image has a resolution of a highest level,
wherein the estimating of the disparity map for the image having the first resolution level includes obtaining a disparity map which minimizes energy including a smooth energy, the smooth energy being based upon a difference in disparities between neighboring pixels in the disparity map.

16. A method of estimating a disparity of a stereo image, comprising:
obtaining a plurality of resolution levels;
calculating a plurality of smooth energy coefficients for the plurality of resolution levels;
estimating a disparity map for a lowest resolution level;
estimating a coarse disparity map for a resolution level higher than the lowest resolution level;
obtaining a fine disparity map for the resolution level higher than the lowest resolution level;
repeating the steps of estimating a coarse disparity map and obtaining of a fine disparity map for additional resolution levels higher than the lowest resolution level; and
outputting a fine disparity map for the highest resolution level,
wherein the estimating of the disparity map for the lowest resolution level image includes obtaining a disparity map which minimizes energy including a smooth energy, the smooth energy being based upon a difference in disparities between neighboring pixels in the disparity map.

17. A computer readable storage medium to control a computer according to a method of estimating a disparity of a stereo image, wherein the method comprises:
obtaining a plurality of images having different resolution levels for the stereo image;
estimating a disparity map for a lowest-resolution level image;
estimating a coarse disparity map for an upper resolution level image by using the disparity;
obtaining a fine disparity map for the upper resolution level image by using the coarse disparity; and
outputting the fine disparity map as a final disparity map for the stereo image if the upper resolution level image has a resolution of a highest level,
wherein the estimating of the disparity map for the lowest-resolution level image includes obtaining a disparity map which minimizes energy including a smooth energy, the smooth energy being based upon a difference in disparities between neighboring pixels in the disparity map.

* * * * *

UNITED STATES PATENT AND TRADEMARK OFFICE
CERTIFICATE OF CORRECTION

| | |
|---|---|
| PATENT NO. | : 7,711,181 B2 |
| APPLICATION NO. | : 11/168346 |
| DATED | : May 4, 2010 |
| INVENTOR(S) | : Seokcheol Kee et al. |

It is certified that error appears in the above-identified patent and that said Letters Patent is hereby corrected as shown below:

First Page Column 1 (Assignee), Line 1 delete "Electroncis" and insert -- Electronics --, therefor.

First page Column 2 (Other Publications), Line 2 delete "Internation" and insert -- International --, therefor.

Column 12, Lines 8-11 in Claim 15, below "map; and" delete "obtaining a final disparity map for the stereo image as a fine disparity map for the upper resolution level image using the coarse disparity map if the upper resolution level image has a high resolution of a highest level; and".

In the Reference file, Claims (12/03/2009), in Claim 6, please remove the equation "$$T(x, y) = \sqrt{\left(\frac{1}{x_k}\sum_{i=1}^{x_k}\frac{I(x+i, y) - I(x-i, y)}{2i}\right)^2 + \left(\frac{1}{y_k}\sum_{i=1}^{y_k}\frac{I(x, y-i) - I(x, y-i)}{2i}\right)^2}$$"

and insert --

$$T(x, y) = \sqrt{\left(\frac{1}{x_k}\sum_{i=1}^{x_k}\frac{I(x+i, y) - I(x-i, y)}{2i}\right)^2 + \left(\frac{1}{y_k}\sum_{i=1}^{y_k}\frac{I(x, y+i) - I(x, y-i)}{2i}\right)^2}$$

--.

Signed and Sealed this
Tenth Day of July, 2012

David J. Kappos
*Director of the United States Patent and Trademark Office*